(12) United States Patent
Hassick et al.

(10) Patent No.: US 6,656,377 B2
(45) Date of Patent: *Dec. 2, 2003

(54) INORGANIC COMPOSITION, PROCESS OF PREPARATION AND METHOD OF USE

(75) Inventors: Denis E. Hassick, Monroeville, PA (US); Michael P. Flaherty, Imperial, PA (US); Pamela J. Dotter, Pittsburgh, PA (US); Robert J. Guerrini, Aliquippa, PA (US)

(73) Assignee: Calgon Corporation, Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/862,759

(22) Filed: May 21, 2001

(65) Prior Publication Data

US 2002/0130087 A1 Sep. 19, 2002

Related U.S. Application Data

(63) Continuation of application No. 09/295,422, filed on Apr. 20, 1999, now Pat. No. 6,306,308.
(60) Provisional application No. 60/104,203, filed on Oct. 14, 1998, and provisional application No. 60/082,448, filed on Apr. 20, 1998.

(51) Int. Cl.[7] .............................. C09K 3/32; C02F 1/52
(52) U.S. Cl. .................. 252/60; 252/181; 210/728; 210/930; 524/401; 524/414; 524/435; 524/436; 524/437
(58) Field of Search ...................... 252/175, 181, 252/60; 516/138; 210/708, 716, 717, 728, 930, 912, 928, 917; 423/304, 306; 524/401, 414, 435, 436, 437

(56) References Cited

U.S. PATENT DOCUMENTS

| | | | | |
|---|---|---|---|---|
| 2,550,490 A | * | 4/1951 | McDonald | 423/306 |
| 3,544,476 A | * | 12/1970 | Aiba et al. | 252/175 |
| 3,929,666 A | * | 12/1975 | Aiba et al. | 423/397 |
| 4,316,810 A | * | 2/1982 | Burnham | 516/104 |
| 4,362,643 A | * | 12/1982 | Kuo et al. | 252/175 |
| 4,507,213 A | * | 3/1985 | Daccord et al. | 516/113 |
| 4,566,986 A | * | 1/1986 | Waldmann | 252/175 |
| 4,582,627 A | * | 4/1986 | Carlsson | 210/728 |
| 4,655,934 A | * | 4/1987 | Rose et al. | 252/181 |
| 4,683,217 A | * | 7/1987 | Lok et al. | 423/306 |
| 4,746,457 A | * | 5/1988 | Hassick et al. | 252/181 |
| 4,800,039 A | * | 1/1989 | Hassick et al. | 252/181 |
| 4,902,779 A | * | 2/1990 | Waldmann | 252/181 |
| 5,035,808 A | * | 7/1991 | Hassick et al. | 210/728 |
| 5,759,401 A | * | 6/1998 | Boussely et al. | 210/605 |
| 6,306,308 B1 | * | 10/2001 | Hassick et al. | 210/716 |

OTHER PUBLICATIONS

Derwent Database on EAST, week 198312, London: Derwent Publications Ltd., AN 1983–29271K, Class E37, SU 928034 B (CHITINSK POLY), abstract.*

American Water Works Assoc., Water Quality and Treatment: A Handbook of Community Water Supplies, 4th Ed., pp. 285–292, McGraw Hill, New York, NY (1990), Month unknown.

(List continued on next page.)

Primary Examiner—Daniel S. Metzmaier
(74) Attorney, Agent, or Firm—Margaret M. Brumm; Michael B. Martin; Thomas M. Breininger

(57) ABSTRACT

A coagulant which is the reaction product of a trivalent metal salt, excluding chromium salts, an acid phosphorous compound and an aluminum hydroxy chloride, and a process for preparing such coagulant. This coagulant may be effectively used to remove suspended solids and various impurities in most water treatment applications.

6 Claims, 3 Drawing Sheets

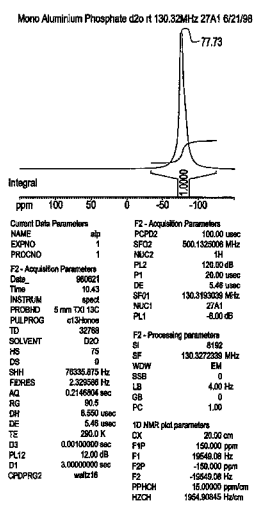

OTHER PUBLICATIONS

Fair et al., Water and Wastewater Engineering vol. 2. "Water Purification and Wastewater Treatment and Disposal", pp. 30–10 to 30–15, Wiley, NY, NY, 1968—Month unknown.

James M. Montgomery, "Water Treatment Principles & Design", Consulting Engineers, Inc., pp. 122–123, 1985 Month unknown.

David A. Mortimer, "Synthetic Polyelectrolytes—A Review", Polymer International, pp. 29–41 (1991), Month unknown.

"Poly Aluminum Hydroxide Salts—Maximizing Performance Through Poly Aluminum Chemistry", World Water & Environmental Engineering, (Sep., 1997).

Rip G. Rice, PhD., "Safe Drinking Water The Impact of Chemicals on a Limited Resource", pp. 22–23, 1985—Month unknown.

Drinking Water Health Effects Task Force, "Health Effects of Drinking Water Treatment Technologies", pp. 83–85, Lewis Publisher, Inc., Chelsea, MI (1989)—Month unknown.

Dempsey et al., "Polyaluminum Chloride and Alum Compositon of Clay—Fulvic Acid Suspensions", Jorn. AWWA, pp. 74–80, (Mar. 1965).

T.H.Y. Tebbutt, Principles of Water Quality Control, $2^{nd}$ Ed., pp. 100–108, Pergamon Press, Oxford, England, 1977, Month unknown.

Charles R. O'Melia, PhD., "Water Treatment Design for the Practicing Engineer", Chapter 4, pp. 65–76, 1978, Month unknown.

* cited by examiner

FIG. 1

Mono Aluminium Phosphate d2o rt 130.32MHz 27Al 6/21/98

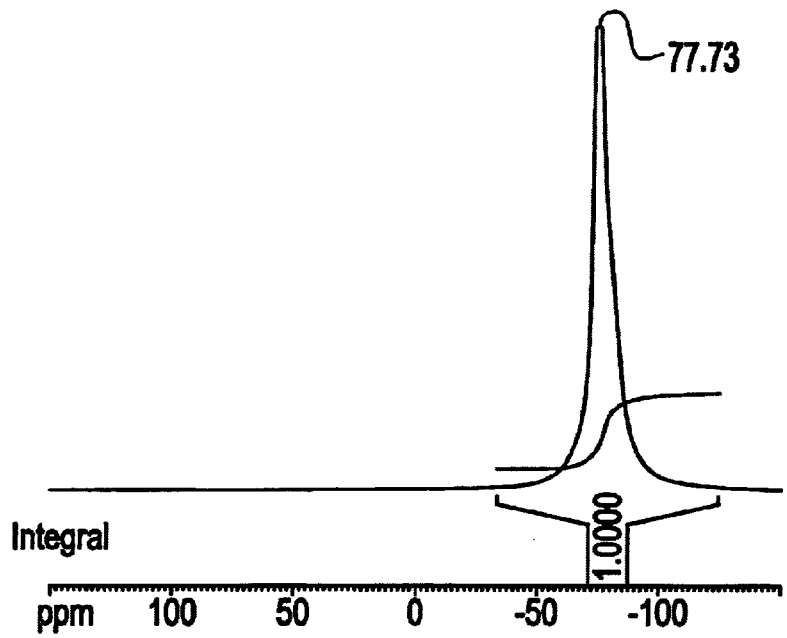

Current Data Parameters
NAME                alp
EXPNO               1
PROCNO              1

F2 - Acquisition Parameters
Date_               980621
Time                10.43
INSTRUM             spect
PROBHD              5 mm TXI 13C
PULPROG             c13Honoe
TD                  32768
SOLVENT             D2O
HS                  75
DS                  0
SHH                 76335.875 Hz
FIDRES              2.329586 Hz
AQ                  0.2146804 sec
RG                  90.5
DH                  6.550 usec
DE                  5.46 usec
TE                  290.0 K
D3                  0.00100000 sec
PL12                12.00 dB
D1                  3.00000000 sec
CPDPRG2             waltz16

F2 - Acquisition Parameters
PCPD2               100.00 usec
SFO2                500.1325006 MHz
NUC2                1H
PL2                 120.00 dB
P1                  20.00 usec
DE                  5.46 usec
SFO1                130.3193039 MHz
NUC1                27Al
PL1                 -6.00 dB F2 - Processing parameters
SI                  8192
SF                  130.3272339 MHz
WDW                 EM
SSB                 0
LB                  4.00 Hz
GB                  0
PC                  1.00

1D NMR plot parameters
CX                  20.00 cm
F1P                 150.000 ppm
F1                  19549.08 Hz
F2P                 -150.000 ppm
F2                  -19549.08 Hz
PPHCH               15.00000 ppm/cm
HZCH                1954.90845 Hz/cm

FIG. 2
Aluminium Chlorohydrate d2o rt 130.32MHz 27Al 6/21/98

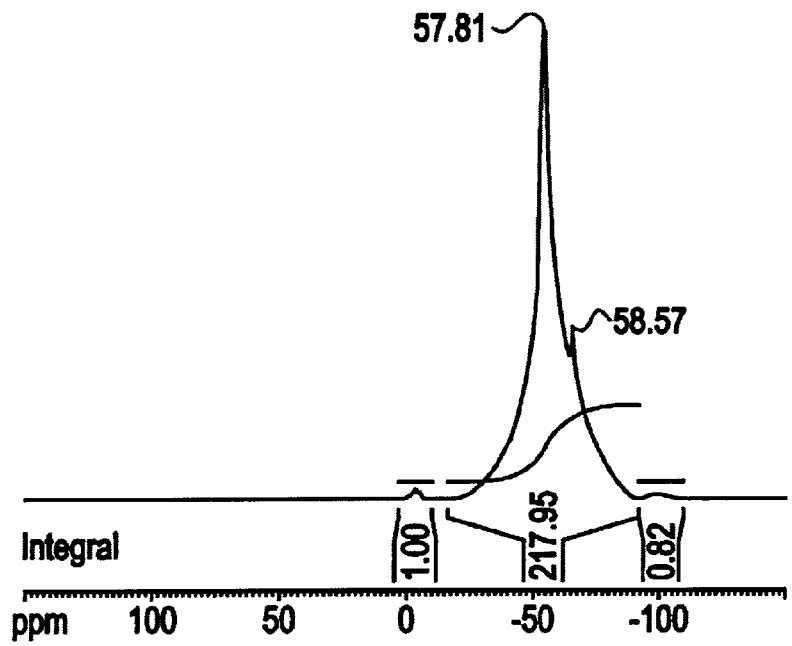

| Current Data Parameters | | F2 - Acquisition Parameters | |
|---|---|---|---|
| NAME | alc | PCPD2 | 100.00 usec |
| EXPNO | 1 | SFO2 | 500.1325006 MHz |
| PROCNO | 1 | NUC2 | 1H |
| | | PL2 | 120.00 dB |
| F2 - Acquisition Parameters | | P1 | 20.00 usec |
| Date_ | 980621 | DE | 5.46 usec |
| Time | 10.35 | SF01 | 130.3193039 MHz |
| INSTRUM | spect | NUC1 | 27Al |
| PROBHD | 5 mm TXI 13C | PL1 | -6.00 dB |
| PULPROG | c13Honoe | | |
| TD | 32768 | F2 - Processing parameters | |
| SOLVENT | D2O | SI | 8192 |
| HS | 77 | SF | 130.3272339 MHz |
| DS | 0 | WDW | EM |
| SHHI | 76335.875 Hz | SSB | 0 |
| FIDRES | 2.329586 Hz | LB | 4.00 Hz |
| AQ | 0.2146804 sec | GB | 0 |
| RG | 90.5 | PC | 1.00 |
| DH | 6.550 usec | | |
| DE | 5.46 usec | 1D NMR plot parameters | |
| TE | 290.0 K | CX | 20.00 cm |
| D3 | 0.00100000 sec | F1P | 150.000 ppm |
| PL12 | 12.00 dB | F1 | 19549.08 Hz |
| D1 | 3.00000000 sec | F2P | -150.000 ppm |
| CPDPRG2 | waltz16 | F2 | -19549.08 Hz |
| | | PPHCH | 15.00000 ppm/cm |
| | | HZCH | 1954.90845 Hz/cm |

FIG. 3
Fecl3+AlC+AlP d2o rt 130.32MHz 27Al 6/21/98

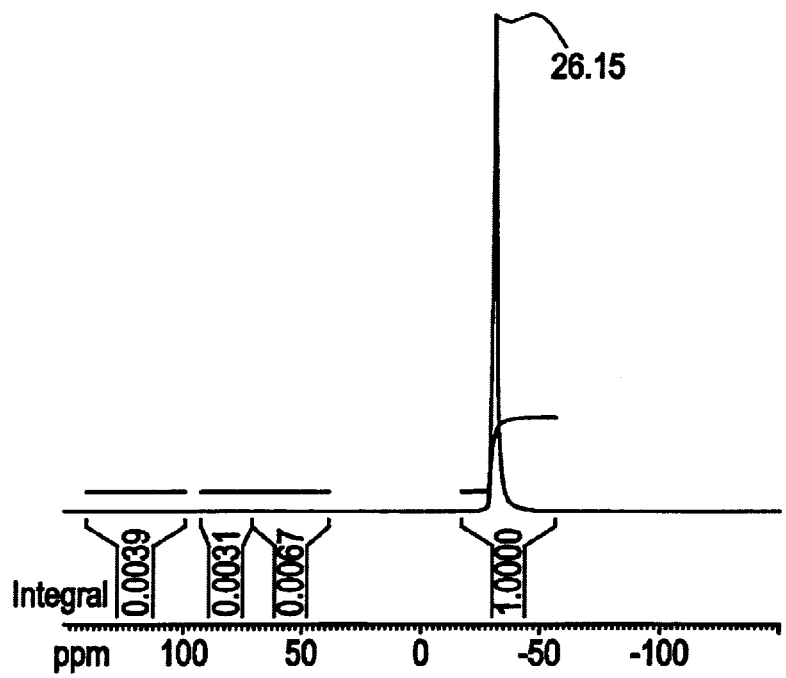

| Current Data Parameters | | F2 - Acquisition Parameters | |
|---|---|---|---|
| NAME | alcalp | PCPD2 | 100.00 usec |
| EXPNO | 1 | SFO2 | 500.1325006 MHz |
| PROCNO | 1 | NUC2 | 1H |
| | | PL2 | 120.00 dB |
| F2 - Acquisition Parameters | | P1 | 20.00 usec |
| Date_ | 980621 | DE | 5.46 usec |
| Time | 10.59 | SFO1 | 130.3193039 MHz |
| INSTRUM | spect | NUC1 | 27A1 |
| PROBHD | 5 mm TXI 13C | PL1 | -6.00 dB |
| PULPROG | c13Honce | | |
| TD | 32768 | F2 - Processing parameters | |
| SOLVENT | D2O | SI | 8192 |
| HS | 75 | SF | 130.3272339 MHz |
| DS | 0 | WDW | EM |
| SHH | 76335.875 Hz | SSB | 0 |
| FIDRES | 2.329586 Hz | LB | 4.00 Hz |
| AQ | 0.2146804 sec | GB | 0 |
| RG | 90.5 | PC | 1.00 |
| DH | 6.550 usec | | |
| DE | 5.46 usec | 1D NMR plot parameters | |
| TE | 290.0 K | CX | 20.00 cm |
| D3 | 0.00100000 sec | F1P | 150.000 ppm |
| PL12 | 12.00 dB | F1 | 19549.08 Hz |
| D1 | 3.00000000 sec | F2P | -150.000 ppm |
| CPDPRG2 | waltz16 | F2 | -19549.08 Hz |
| | | PPHCH | 15.00000 ppm/cm |
| | | HZCH | 1954.90845 Hz/cm | though, these coagulants are normally
INORGANIC COMPOSITION, PROCESS OF PREPARATION AND METHOD OF USE This is a continuation of U.S. Ser. No. 09/295,422, filed Apr. 20, 1999, now U.S. Pat. No. 6,306,308.

CROSS-REFERENCE TO RELATED APPLICATIONS

This application claims priority on United States Provisional Patent Application Serial Nos. 60/104,203 and 60/082,448 which were filed on Oct. 14, 1998 and Apr. 20, 1998, respectively.

BACKGROUND OF THE INVENTION

The present invention relates generally to coagulants for water treatment applications. In general, coagulants are utilized to remove suspended solid particles from aqueous systems.

Coagulants typically fall into the general category of inorganic (trivalent, divalent metal salts) or organic (water soluble polyelectrolytes). Examples of widely used inorganic coagulants are aluminum sulfate $Al_2(SO_4)_3$, aluminum chloride $AlCl_3$, aluminum chlorohydrate $Al_2(OH)_5Cl$, ferric chloride $FeCl_3$, ferric sulfate $Fe_2(SO_4)_3$, and calcium chloride. Examples of commonly used water soluble or solution polyelectrolytes are p-DMDAAC (polydimethyl diallyl ammonium chloride) and Epi-DMA polyamine.

Many inorganic coagulants are compatible with solution cationic polyelectrolytes and can be combined to form stable combinations. In recent years, many different blend formulations of an inorganic coagulant with a high charge solution cationic polyelectrolyte have been patented and marketed. An example of an inorganic coagulant/polymer blend might be: 5 parts of a standard 28° Baumé $AllCl_3$ solution mixed with 1 part of Epi-DMA polyamine. More examples, limits, and ranges are explained in U.S. Pat. Nos. 4,746,457, 4,800,039, and 5,035,808 to Calgon Corporation, and further in U.S. Pat. Nos. 2,862,880, 3,285,849, 3,472,767, 3,489,681, 3,617,569, 4,137,165, 4,450,092, 4,582,627, 4,610,801, and 4,655,934, the disclosures of which are incorporated herein by reference in their entirety. Normally, these compositions are physical blends of an inorganic trivalent metal salt solution and a water soluble polymer solution, which is a simple mixture of the components where both components retain their original identity or chemical composition, but provide utility and advantages such as:

1. a synergy of adding the inorganic and polymeric coagulants simultaneously as a blend; and
2. ease of use—using one product instead of two (thereby eliminating feed systems, equipment, and handling).

Wastewater treatment systems typically require the use of trivalent metal salts, a polymer or a combination of both in the coagulation process. Both ferric coagulants such as $FeCl_3$ blends and aluminum coagulants such as alum or $Al_2(OH)_5Cl$ blends are often used for these processes. Both the ferric and aluminum coagulants provide different desirable properties. However, these coagulants are normally incompatible with each other.

It was thus desired in the art to develop a single coagulant which would combine the desirable properties of ferric and aluminum coagulants.

SUMMARY OF THE INVENTION

The present invention comprises a composition that is the reaction product of a trivalent metal salt, excluding chromium salts, an acid phosphorous compound and an aluminum hydroxy chloride, and a process for preparing the same.

The method of use according to the present invention comprises adding this reaction product in an effective amount to the solution to be treated. The composition of the present invention is an excellent and unique coagulant for most water treatment applications.

As used herein, the phrase "effective amount" refers to that amount of the claimed reaction product which is helpful to at least partially treat (coagulate) the impurities in the wastewater or system being treated.

BRIEF DESCRIPTION OF THE DRAWINGS

The above composition will become more apparent when reference is made to the following detailed description, taken in conjunction with the appended figures, in which:

FIG. 1 is an Al-27 NMR spectrum of monoaluminum phosphate;

FIG. 2 is an Al-27 NMR spectrum of aluminum chlorohydrate; and

FIG. 3 is an Al-27 NMR spectrum of the reaction mixture of iron (III) chloride, monoaluminum phosphate and aluminum chlorohydrate.

These figures are discussed in detail below.

DETAILED DESCRIPTION OF THE INVENTION

The present invention was discovered when the inventors were attempting to obtain the desirable properties of $FeCl_3$ blends and $Al(OH)_5Cl$ blends by mixing these two inorganics and then combining the resultant mixture with a cationic polyelectrolyte and other ingredients. However, they discovered that mixtures of trivalent metal salts such as $FeCl_3$ and aluminum hydroxy chlorides such as $Al_2(OH)_5Cl$ are incompatible and all attempts to combine such mixtures ended in a gelled/solidified reaction product which was not usable.

It was unexpectedly discovered that $FeCl_3$ solution and $Al_2(OH)_5Cl$ solution can be stabilized and combined through the use of a third ingredient, monoaluminum phosphate. The inventors have discovered a method of combining these previously incompatible coagulants and creating a stable, complex ion coordination compound that exhibits increased efficacy as a coagulant for industrial and municipal water treatment.

A composition, and process for preparing the same, has been discovered by the inventors comprising the reaction product of a trivalent metal salt other than chromium salts, an aluminum hydroxy chloride, and an acid phosphorous compound which acts as a stabilizing compound.

The preferred process of preparing the present invention is the addition of the acid phosphorous compound (stabilizer) to the trivalent metal salt, soon followed by the addition of the aluminum hydroxy chloride. A small exotherm results from the addition of the acid phosphorous compound (stabilizer) to the trivalent metal salt. A larger and more vigorous exotherm results from the subsequent addition of the aluminum hydroxy chloride. Based upon this exotherm, as well as color changes and partial precipitation (and re-dissolution), it is believed that the components are reacting and a new compound is formed. Although the order of addition of these compounds to form the new compound may be altered, the above order of addition is preferred. If the trivalent metal salt and the aluminum hydroxy chloride are combined without the acid phosphorous compound, a slurry will be formed which will generally solidify in less than an hour. In order to create a stable final product, if this order of addition is utilized, the acid phosphorous compound should be added to this mixture prior to solidification, or preferably within 40 minutes. However, reconstitution after solidification is possible by the addition of the acid phosphorous compound. The least preferred order of addition is when the acid phosphorous compound is alone first mixed with the aluminum hydroxy chloride, because a solid mass will be formed almost instantaneously. However, this solid mass can be reconstituted by the addition of $FeCl_3$. For these reasons, the above noted order of addition is preferred.

This new resultant compound is stable and appears to be different in composition from the compounds used in the preparation process. The conclusion that a new compound is formed is supported by FIGS. 1–3 which illustrate Al-27 NMR spectra for a compound formed from the reaction of the volume formula 10 $FeCl_3$ (about 40% active raw material in water), 3 monoaluminum phosphate ($Al(H_2PO_4)_3 \cdot XH_2O$) (about 50 wt % in water), and 5 $Al(OH)_5Cl$ (about 50 wt % in water). Commerciably available $FeCl_3$ solution is 38 to 42% active raw material in water. Commercially available monoaluminum phosphate and $Al(OH)_5Cl$ are both 50 wt % in water, plus or minus 1 to 2%.

The combination of a peak's shape and position yield structural information in NMR spectroscopy. The position is based upon a relative marker to a selected standard material and is measured in ppm shifts in frequency. The standard reference material used in these spectra was aluminum oxide ($Al_2O_3$) at 0 ppm. The shape of the peak (singlet, doublet, etc.) is dependent upon the nuclei's interaction with neighboring atoms. The combination of peak position and shape is a function of the nuclei's environment, and thus, its structure.

FIG. 1 is an Al-27 NMR spectrum of monoaluminum phosphate. This spectrum shows a single band centered at ca. −77.7 ppm relative to the standard. The width of the peak is indicative of the structure in solution.

FIG. 2 is an Al-27 NMR spectrum of aluminum chlorohydrate ($Al_2(OH)_5Cl$). This spectrum shows a very broad set of peaks centered at ca. −57.8 and −68.6 ppm with the former peak being the much stronger band. This spectrum shows two peaks which are overlapped. There are also two significantly smaller peaks on either side of these two major bands which are probably minor impurities. This material is known to be polymeric in nature. In general, the higher the molecular weight of a material the more broad the peaks become.

FIG. 3 is an Al-27 NMR spectrum of the reaction mixture of the present invention. This spectrum shows the product of the claimed reaction mixture of iron (III) chloride, monoaluminum phosphate and aluminum chlorohydrate according to the current reaction, using the concentrations and parts per volume of these three compounds in the preferred embodiment. In FIG. 3, the aluminum NMR peak is a very much sharper singlet and is shifted to a position at ca. −26.2 ppm relative to the standard. These changes indicate that a reaction has taken place, that the two component raw materials (iron(III) chloride and aluminum chlorohydrate) are most likely limiting reagents in this reaction, and that the structure of the final product is simpler than the aluminum chlorohydrate precursor. The aluminum exists in a single type of chemical environment, hence the rationale for the proposed structure of a new compound.

The molecular formula of this preferred embodiment, which is the subject of FIG. 3 is:

Iron(III) salt of $[Al_n(OH)_a(H_2PO_4)_b(Cl)_c(H_2O)_d]^{3n-a-b-c}$ where a+b+c>3n This new composition is the product of a Lewis/Acid Base type reaction in which a stable, complex ion coordination compound is formed as follows:

A+B→"intermediate"(4° C. temperature rise observed)"intermediate"+C→new compound (20° C. temperature rise observed)

where: (% Active Basis)

|  | (% Active Basis) |
|---|---|
| A = Iron Chloride | 17.5%–20% |
| B = Phosphoric Acid, Aluminum Slat (3:1) | 8%–10% |
| C = Aluminum Chloride, Basic | 11.0%–13% |

A typical structure of this new compound of the preferred embodiment is represented below where the $H_2O$, Cl, OH and $H_2PO_4$ ligands can vary in number, as well as in their position on the metal ion in the coordination complex. The nature of the bond between each ligand and the central metal atom is coordinate covalent.

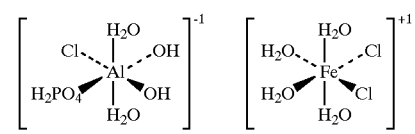

The preferred embodiment of the present invention composition, by volume, is:

| | |
|---|---|
| 10 | $FeCl_3$ (aqueous solution about 40% active raw material in water) |
| 3 | Monoaluminum phosphate ($Al(H_2PO_4)_3 \cdot XH_2O$) (about 50 wt % in water) |
| 5 | $Al_2(OH)_5Cl$ (about 50 wt % in water) |
| 1 | $CaCl_2$ (30% solution) |
| 2 | Ca-250 (Epi-DMA polyamine) (50 wt % in water) |

Multiple experiments involving the modification of the volume of the above ingredients in the preferred embodiment have been performed. It has been determined that although the above noted volumes provide the preferred combination, these ratios may be altered while still maintaining a stable reaction product and the desired coagulation properties to varying degrees. It has been determined that (using the concentrations set forth above) the volume of the $FeCl_3$ component may be varied from 3 to 30 parts, the monoaluminum phosphate may be varied from 0.5 to 10 parts, and the $Al_2(OH)_5Cl$ may be increased to as high as 20 parts. However, the upper limit of the $Al_2(OH)_5Cl$ volume appears to be 20 because precipitation begins to occur at this level. Although the quality of the resultant compounds varied proportionally with the deviation from the preferred embodiment, the resultant compounds provided stable reaction products. Further tests have performed varying the combinations of different trivalent metal salts, acid phosphorous compounds and aluminum hydroxy chlorides, as well as the volumes of each such component. The Example below demonstrates the results of selected tests on volume and component variations.

The volumetric ratios set forth above for components of the preferred embodiment are also applicable to the various claimed combinations of the other trivalent metal salts, acid phosphorous compounds and aluminum hydroxy chlorides. It is known by one skilled in the art that these various compounds can be obtained in varying concentrations. In order to obtain the most preferred ratio of components of various substitute components of varying concentration, one must obtain the same ratio of molar amounts of ferric, phosphate or phosphite and aluminum as that of the preferred embodiment above. For example, phosphoric acid is commercially available in about 85 wt % in water as compared to about 50 wt % of monoaluminum phosphate. Thus a component of different concentration can be used if the correct molar ratio is obtained.

It appears that the calcium chloride and CA-250 components are present only as physical blend with the compound which is the result of the reaction. The resulting blend of the reaction product and the $CaCl_2$ and CA-250 (Epi-DMA polyamine) is a "sweep-floc" which functions as a coagulant and a flocculent and, as noted above, could be useful in many water treatment processes. Other standard additives can also be mixed with the reaction product.

In place of the CA-250 (Epi-DMA polyamine), p-DMDAC may be utilized under certain circumstances in the physical blend with the subject reaction product. The p-DMDAAC may be utilized when the trivalent metal salt $FeCl_3$ (in the preferred embodiment) is diluted by 10 to 40% with water prior to the addition of the acid phosphorous compound and the aluminum hydroxy chloride. In order to utilize p-DMDAAC with the already prepared reaction product of the preferred embodiment, the entire reaction product must be diluted by 10 to 40% with water prior to the addition of p-DMDAAC. If phosphoric acid is substituted for the monoaluminum phosphate of the preferred embodiment, dilution of either $FeCl_3$ or the entire reaction product should be by 10 to 80% with water, otherwise precipitation will occur.

Tests have also been performed involving the variance of the amounts of $CaCl_2$ and the amount of the CA-250 (Epi-DMA polyamine). The volumes of these compounds have been varied both together and on an independent basis. The variance of these two components appears to have a negligible effect on the formulation.

As noted above, although the preferred embodiment utilizes $FeCl_3$ as the trivalent metal salt, monoaluminum phosphate as the acid phosphorous compound, and $Al_2(OH)_5Cl$ as the aluminum hydroxy chloride, substitutions may be made for each of these compounds while still resulting in a stable, effective reaction product.

The preferred trivalent metal salts are those of Group 8. The more preferred trivalent metal salts are metal halides. However, the most preferred trivalent metal salts are ferric, such as $FeCl_3$, $Fe_2(SO_4)_3$, $FeBr_3$ and $Fe(NO_3)_3$. Additionally, blends of the foregoing may be utilized. Ferric halide is more preferred, while ferric chloride is most preferred. The preferred anions of the salt are chloride and halide. Sulfate is a less preferred anion of the salt. Nitrate may also be employed as an anion for the salt.

The preferred acid phosphorous compounds of the present invention are selected from the group consisting of acid phosphates (including phosphorous acid), acid phosphates (including phosphoric acid), and phosphonic acid. Acid phosphorous compounds having the following formula may be utilized:

$$M_nH_xPO_q$$

Where:
M=cation such as a metal or ammonium
n=0 to 2
x=1 to 3
q=3 or 4

For example, the following acid phosphorous compounds may be utilized: monoaluminum phosphate ($Al(H_2PO_4)_3 \cdot XH_2O$), phosphoric acid ($H_3PO_4$), phosphorous acid ($H_3PO_3$), sodium phosphate monobasic ($NaH_2PO_4$), sodium phosphate dibasic ($Na_2HPO_4$), HEDP (($CH_3C(OH)(PO_3H_2)_2$), vinyl phosphonic acid ($H_2C=CHP(O)(OH)_2$), dimethyl phosphite (($CH_3O_2)P_2(O)H$), $(NH_4)_2HPO_4$, $NH_4H_2PO_4$, potassium phosphate monobasic ($KH_2PO_4$), and $K_2HPO_4$. The more preferred acid phosphorous compounds are those which are non-organic due to their lower cost.

The aluminum hydroxy chloride compounds which may be used in the formulation of the composition of the present invention are those of the general formula $Al_2(OH)_yCl_z$, where y=0.1 to 5 and z=1 to 5.9. The more preferred are those where y=1 to 5 and z=1 to 5. The most preferred are those where y=1.8 to 5 and z=1 to 4.2.

In preparing the claimed reaction product, $AlCl_3$ can be utilized as the trivalent metal salt and combined with $Al_2(OH)_5Cl$ and a stabilizer (acid phosphorous compound). An exotherm will occur and a reaction product will be formed. $AlCl_3$ can also be utilized as a substitute for the aluminum hydroxy chloride component and combined with $FeCl_3$ and a stabilizer. However, in this circumstance, a reaction product is not formed and a blend is achieved. Nevertheless, this blend exhibits good coagulation properties.

Experiments have also been performed where the $CaCl_2$ compound has been substituted with $MgCl_2$ and $BaCl_2$ without resulting serious detriment to the performance of the resultant mixture with the reaction product. The CA-250 (Epi-DMA polyamine) may also be substituted with other Epi-DMA polyamines. CA-250 is preferred because of its relative low to medium molecular weight. CA-250 is a commercial polyamine product sold by Calgon Corporation.

This resultant new compound has been demonstrated to be an excellent and unique coagulant for most water treatment applications including E-coat waste treatment, waterborne paint waste coagulation, oily waste and solvent-borne paint detackification. It is also exhibits utility in general wastewater treatment, municipal wastewater treatment, metals removal from water, paper making waste water, water containing chemical compounds, water containing organic compounds, water containing biological compounds, poultry processing waste, ink containing solutions, raw water clarification (such as municipal drinking water and industrial purification), oil/water separation, water containing suspended solids, color removal (colored solutions), waste clay slurry, coal waste, mineral processing water, oily waste, water containing suspended solids, water containing paint solids and others. The resultant new compound has also been demonstrated to remove metals from water, including heavy metals such as lead and nickel. E-coat waste is the wastewater generated from electrolytic primer coating.

The method of using the new compound for coagulation in these various systems consists of adding the new compound to the system in an effective amount.

This new compound also may be utilized for enhanced coagulation. Enhanced coagulation is the reduction of total organic contaminants (TOC). The reduction of organic contaminants in drinking water is desirable to minimize formation of chlorinated hydrocarbons formed during the chlorination process.

The most preferred method for producing the claimed reaction product entails the following steps:

1. At ambient temperature, add 3 parts by volume monoaluminum phosphate solution (about 50 wt % in water)

to 10 parts by volume FeCl₃ aqueous solution (about 40% active raw material in water). During the addition of the monoaluminum phosphate solution to the FeCl₃ solution, some reaction will take place. There may be some partial precipitations and color changes—and striations in the solutions. However, when the reaction is complete, everything is in solution and it appears stable.

2. Next, the 5 parts by volume aluminum chlorohydrate solution (about 50 wt % in water) is added to the mixture of FeCl₃ and monoaluminum phosphate (and further reaction takes place). The resultant solution goes through a violent exotherm. The solution becomes hot, and the solution becomes homogeneous. When the solution cools down, it remains compatible and homogeneous.

3. Preferably, 1 part by volume CaCl₂ (30% solution) and 2 parts per volume of a polymer, such as CA-250 (EPI-DMA polyamine 50 wt %) are then added. The CaCl₂ is added for hardness and the polymer to enhance coagulation and to begin flocculation (to help form the pin floc). There appears to be no further reaction when the CaCl₂ and the polymer are added.

As noted above, it will be apparent to one skilled in the art that this process may be duplicated utilizing the other trivalent metal salts, acid phosphorous compounds, and aluminum hydroxy chlorides herein claimed, if the same noted molar ratios are utilized.

EXAMPLE

The following example is included to further describe and demonstrate the invention in greater detail. This example is not intended to limit the scope of the invention in any way. This example, and the tables included therein, demonstrate the performance of the claimed invention, including the preferred embodiment and other claimed reaction products formed from various Group 8 trivalent metal salts, acid phosphorous compounds and aluminum hydroxy chloride components, on the treatment of E-coat waste. Also included are entries illustrating the effectiveness of treating E-coat waste with only a trivalent metal salt and only an aluminum hydroxy compound.

The following test procedure was used to compile the results contained in the following tables.

Dilution of Product 1. 2.5 gms of the selected coagulant and/or reaction product was weighed and placed into a B-cup.
2. 7.5 gms of deionized water was placed into the same B-cup and mixed until uniform.

Test Procedure 1. 495 mls of deionized water was added to a glass jar (a graduated cylinder was used).
2. The glass jar was placed on a gang stirrer and mixed at 100 rpm.
3. 5 mls of neat E-coat waste was added to the water.
4. 0.6 mls of the selected coagulant and/or reaction product solution (300 ppm) was added to the glass jar.
5. The solution was mixed at 100 rpm for 15 seconds.
6. The pH was lowered to 2.9 using stock $H_2SO_4$ (10 gm $H_2SO_4$+190 gm $DiH_2O$).
7. The number of drops of stock $H_2SO_4$ used to lower the pH was recorded.
8. The solution was mixed at 100 rpm for 15 seconds.
9. The pH was increased to 8.5 using a soda ash solution (20 gm soda ash+80 gm $DiH_2O$).
10. The number of drops of soda ash solution used to increase the pH was recorded.
11. The solution was mixed at 100 rpm for 15 seconds.
12. 2 mls of flocculent—Pol EZ 8736 or Pol EZ 7736 [0.5% product] which are commercially available high molecular weight polymers sold by Calgon Corporation—was placed in a syringe and added by the following method:

a) the tip of the syringe was placed below the surface of the solution at approximately the top of the vortex;
b) the flocculent was added and timed for exactly 10 seconds;
c) after the ten second period ended, the agitation was turned down to 50–60 rpm;
d) the floc was allowed to develop for 30 seconds; and
e) the agitation was then turned off.

13. The floc was then allowed to settle for 10 minutes.
14. The floc size and the appearance of the solution was then recorded (visual inspection only).
15. 20 mls of the solution was removed with a syringe for a turbidity reading.
16. The turbidity reading in NTU (nephelometric turbidity units) was recorded.
17. The agitation was then turned on and the motion speed was slowly increased to ≧50 rpm.
18. The solution was mixed for 30 seconds and the percentage of detackification was recorded.
19. The motor speed was then increased to 100 rpm and the solution was mixed for 30 seconds.
20. The percentage of detackification was then recorded (if detackification of 100% was recorded at 50 rpm, no reading was necessary at 100 rpm and therefore was not taken).

Unless otherwise noted, this procedure was utilized to obtain the results set forth in the tables below. Flocculation refers to the settling of suspended solid particles in the solution. Turbidity as used herein is defined as the cloudiness of the solution caused by suspended particles.

TABLE 1

This table illustrates the performance of the preferred embodiment, 10 $FeCl_3$, 3 $(Al(H_2PO_4)_3.XH_2O)$ and 5 $Al_2(OH)_5Cl$, 1 $CaCl_2$ and 2 Ca-250, in the concentrations set forth above, as 3930-93. In 3982-84A, the $(Al(H_2PO_4)_3.XH_2O)$ was substituted with HEDP in the same molar ratio. In 3982-86A and 3982-87, the $(Al(H_2PO_4)_3.XH_2O)$ has been likewise substituted with vinyl phosphonic acid and dimethyl phosphite, respectively.

TABLE 1

| Description | 3930-93 Preferred embodiment | 3982-84a HEDP | 3982-86a Vinyl Phosphonic acid | 3982-87 Dimethyl Phosphite |
|---|---|---|---|---|
| Product Dilution (Deionized water/product) | 7.5 gms/ 2.5 gms | 7.5 gms/ 2.5 gms | 7.5 gms/ 2.5 gms | 7.5 gms/ 2.5 gms |
| Appearance | medium amber | med.-dk amber | yellow | very pale blue |
| Use Concentration (mls/ppm) | 0.60 mls/ 300 ppm | 0.60 mls/ 300 ppm | 0.60 mls/ 300 ppm | 0.60 mls/ 300 ppm |
| E-coat Composition | 495 mls/ 5 mls | 495 mls/ 5 mls | 495 mls/ 5 mls | 495 mls/ 5 mls |
| pH to 2.9 | 30 drops | 29 drops | 34 drops | 31 drops |
| pH to 8.5 | 45 drops | 50 drops | 52 drops | 40 drops |
| Floc size/ appearance | large/hazy | med. fluffy/ sl. haze | large/lt. haze | med.-lg./ sl. haze |
| Turbidity | 93.3 | 54.2 | 39.6 | 72.4 |
| Detackification 50 rpm: | good 100% | fair 50% | fair-good 65% | bad 0% |
| 100 rpm | | 100% | 100% | 60% |

TABLE 2

This table likewise illustrates how the performance of the preferred embodiment is effected by changes in the type and amount of the acid phosphorous compound utilized. The composition of the preferred embodiment remained constant for each trial, except: in 3982-79A, a lower volume of $(Al(H_2PO_4)_3 \cdot XH_2O)$ ("MAP") was utilized; in 3982-79B, a lower volume of $H_3PO_4$ was substituted for the MAP; in 3982-79C, $H_3PO_4$ was substituted for the MAP in the same volume; and in 3982-80G, $NaH_2PO_4$ was substituted for the MAP in the same volume.

TABLE 2

|  | 3930-93 | 3982-79A | 3982-79B | 3982-79C | 3982-80A | 3982-80G |
|---|---|---|---|---|---|---|
| Description | Preferred embodiment | Low MAP | Low $H_3PO_4$ | Std $H_3PO_4$ | Std $H_3PO_3$ | Std $NAH_2PO_4$ |
| Product Dilution (Deionized water/product) | 7.5 gms/ 2.5 gms | 7.5 gms/ 2.5 gms | 7.5 gms/ 2.5 gms | 7.5 gms/ 2.5 gms | 7.5 gms/ 2.5 gms | 7.5 gms/ 2.5 gms |
| Appearance | good/med. amber | good/dk. amber | good/dk. amber | good/yellow | good/dk. amber | good/dk. amber |
| Use Concentration (mls/ppm) | 0.60 mls/ 300 ppm | 0.60 mls/ 300 ppm | 0.60 mls/ 300 ppm | 0.60 mls/ 300 ppm | 0.60 mls/ 300 ppm | 0.60 mls/ 300 ppm |
| E-coat Composition Deionized water/ e-coat waste | 495 mls/ 5 mls | 495 mls/ 5 mls | 495 mls/ 5 mls | 495 mls/ 5 mls | 495 mls/ 5 mls | 495 mls/ 5 mls |
| pH to 2.9 | 27 drops | 25 drops | 24 drops | 25 drops | 23 drops | 24 drops |
| pH to 8.5 | 60 drops | 60 drops | 60 drops | 60 drops | 60 drops | 60 drops |
| Floc size/appearance | very lg./sl. haze | lg.-tight/ very sl. haze | very lg./hazy | lg. loose/sl. haze | med. loose/almost clear | lg. loose/ sl. haze |
| Turbidity | 90/88 | 67 | 72 | 68 | 31 | 44.7 |
| Detackification 50 rpm: 100 rpm: | good 90% 100% | good 100% | good 100% | good 100% | good 90% 100% | good 100% |

TABLE 3

Tables 3 and 4 illustrate the effect of altering the use concentration of the preferred embodiment. The numbers included under the heading "Description" refer to the volumes 10 $FeCl_3$, 3 $(Al(H_2PO_4)_3 \cdot XH_2O)$, 5 $Al_2(OH_5)Cl$, 1 $Cacl_2$ and 2 Ca-250, of the component concentrations of each set forth above.

TABLE 3

|  | #1 | #2 | #3 | #4 | #5 | #6 |
|---|---|---|---|---|---|---|
| Description | Preferred Embodiment 10 + 3 + 5 + 1 + 2 | Preferred Embodiment 10 + 3 + 5 + 1 + 2 | Preferred Embodiment 10 + 3 + 5 + 1 + 2 | Preferred Embodiment 10 + 3 + 5 + 1 + 2 | Preferred Embodiment 10 + 3 + 5 + 1 + 2 | Preferred Embodiment 10 + 3 + 5 + 1 + 2 |
| Product Dilution Deionized water/ product | 7.5 gms/ 2.5 gms | 7.5 gms/ 2.5 gms | 7.5 gms/ 2.5 gms | 7.5 gms/ 2.5 gms | 7.5 gms/ 2.5 gms | 7.5 gms/ 2.5 gms |
| Appearance | amber | amber | amber | amber | amber | amber |
| Use Concentration (mls/ppm) | 0.0 mls/ 0 ppm | 0.04 mls/ 20 ppm | 0.10 mls/ 50 ppm | 0.20 mls/ 100 ppm | 1.00 mls/ 500 ppm | 2.00 mls/ 1000 ppm |
| E-coat Composition Deionized water/ e-coat waste | 495 mls/ 5 mls | 495 mls/ 5 mls | 495 mls/ 5 mls | 495 mls/ 5 mls | 495 mls/ 5 mls | 495 mls/ 5 mls |
| pH to 2.9 | n/a | n/a | n/a | n/a | n/a | n/a |
| pH to 8.5 | n/a | n/a | n/a | n/a | n/a | n/a |
| Floc size/appearance | tacky | tacky | tacky | tacky | hard floc/clear | spongy floc |
| Turbidity | 58.5 | 49.9 | 48.2 | 34.1 | 14.8 | 32.9 |
| Detackification 100 rpm: | bad 0% | bad 0% | bad 0% | bad 0% | good 0% | good 0% |

TABLE 4

|  | #1 | #2 | #3 | #4 | #5 | #6 |
|---|---|---|---|---|---|---|
| Description | Preferred Embodiment 10 + 3 + 5 + 1 + 2 | Preferred Embodiment 10 + 3 + 5 + 1 + 2 | Preferred Embodiment 10 + 3 + 5 + 1 + 2 | Preferred Embodiment 10 + 3 + 5 + 1 + 2 | Preferred Embodiment 10 + 3 + 5 + 1 + 2 | Preferred Embodiment 10 + 3 + 5 + 1 + 2 |
| Product Dilution (Deionized water/ product) | 7.5 gms/ 2.5 gms | 7.5 gms/ 2.5 gms | 7.5 gms/ 2.5 gms | 7.5 gms/ 2.5 gms | 7.5 gms/ 2.5 gms | 7.5 gms/ 2.5 gms |

TABLE 4-continued

|  | #1 | #2 | #3 | #4 | #5 | #6 |
|---|---|---|---|---|---|---|
| Appearance | amber | amber | amber | amber | amber | amber |
| Use Concentration (mls/ppm) | 0.40 mls/ 200 ppm | 0.60 mls/ 300 ppm | 0.80 mls/ 400 ppm | 1.00 mls/ 500 ppm | 1.20 mls/ 600 ppm | 1.40 mls/ 700 ppm |
| E-coat Composition Deionized water/ e-coat waste | 495 mls/ 5 mls | 495 mls/ 5 mls | 495 mls/ 5 mls | 495 mls/ 5 mls | 495 mls/ 5 mls | 495 mls/ 5 mls |
| pH to 2.9 | n/a | n/a | n/a | n/a | n/a | n/a |
| pH to 8.5 | n/a | n/a | n/a | n/a | n/a | n/a |
| Floc size/appearance | sl. tacky | sl. tacky | sl. tacky | fluffy | fluffy | fluffy |
| Turbidity | 80.6 | 62.1 | 63.9 | 41.6 | 39.0 | 39.9 |
| Detackification | fair | good | good | good | good | good |
| 50 rpm: | >50% | 95% | 100% | 100% | 100% | 100% |

TABLE 5

Table 5 provides a comparative example of the testing of the preferred embodiment 3920-93, compared to the performance of the individual components thereof. Nos. 1 through 5 are demonstrative of the use of the individual component alone noted after the heading "Description".

TABLE 5

|  | 3930-93 | 1 | 2 | 3 | 4 | 5 |
|---|---|---|---|---|---|---|
| Description | Preferred Embodiment | 40% $FeCl_3$ sol. | 50% MAP sol. | 50% $Al_2OH_5Cl$ sol. | 30% $CaCl_2$ sol. | 50% CA-250 sol. |
| Product Dilution (Deionized water/ product) | 7.5 gms/ 2.5 gms | 7.5 gms/ 2.5 gms | 7.5 gms/ 2.5 gms | 7.5 gms/ 2.5 gms | 7.5 gms/ 2.5 gms | 7.5 gms/ 2.5 gms |
| Appearance | med. amber | yellow | water white/clear | water white/clear | water white/clear | water white/clear |
| Use Concentration (mls/ppm) | 0.60 mls/ 300 ppm | 0.60 mls/ 300 ppm | 0.60 mls/ 300 ppm | 0.60 mls/ 300 ppm | 0.60 mls/ 300 ppm | 0.60 mls/ ppm |
| E-coat Composition Deionized water/ e-coat waste | 495 mls/ 5 mls | 495 mls/ 5 mls | 495 mls/ 5 mls | 495 mls/ 5 mls | 495 mls/ 5 mls | 495 mls/ 5 mls |
| pH to 2.9 | 41 drops | 38 drops | 44 drops | 46 drops | 50 drops | 50 drops |
| pH to 8.5 | 64 drops | 64 drops | 66 drops | 68 drops | 69 drops | 70 drops |
| Floc size/appearance | lg.-vig./ slight haze | extra lg./ very hazy | lg./hazy | fine/very hazy | very fine/turbid | jelly/turbid |
| Turbidity | 76 | 146 | 138 | 181 | 275 | 296 |
| Detackification | good | bad | very bad | fair | none | none |
| 50 rpm: | 100% | 0% | 0% | 20% | 0% | 0% |
| 100 rpm: | 100% | 40% | 20% | 75% | 0% | 0% |

TABLE 6

Table 6 demonstrates the effect of varying the volume composition of components of the preferred embodiment and the effect of the complete omission of the $Al_2OH_5Cl$ component. The ratios noted in this table utilize the concentrations of each component set forth above.

TABLE 6

|  | #1 | #2 | #3 | #4 | #5 | #6 |
|---|---|---|---|---|---|---|
| Description | $FeCl_3$ + MAP | $FeCl_3$ + MAP + $Al_2OH_5Cl$ | $Fe_3$ + MAP + $Al_2OH_5Cl$ | $Fe_3$ + MAP + $Al_2OH_5Cl$ | $Fe_3$ + MAP + $Al_2OH_5Cl$ + $CaCl_2$ | $Fe_3$ + MAP + $Al_2OH_5Cl$ + $CaCl_2$ + CA-250 |
| Ratio (mls) | 10 + 3 | 10 + 3 + 5 | 15 + 3 + 5 | 10 + 3 + 10 | 10 + 3 + 5 + 1 | 10 + 3 + 5 + 1 + 2 |
| Product Dilution | 7.5 gms/ | 7.5 gms/ | 7.5 gms/ | 7.5 gms/ | 7.5 gms/ | 7.5 gms/ |

TABLE 6-continued

|  | #1 | #2 | #3 | #4 | #5 | #6 |
|---|---|---|---|---|---|---|
| Deionized water/ product | 2.5 gms | 2.5 gms | 2.5 gms | 2.5 gms | 2.5 gms | 2.5 gms |
| Appearance | Yellow | Amber | Amber | Very dark amber | Amber | Amber |
| Use Concentration (mls/ppm) | 0.60 mls/ 300 ppm | 0.60 mls/ 300 ppm | 0.60 mls/ 300 ppm | 0.60 mls/ 300 ppm | 0.60 mls/ 300 ppm | 0.60 mls/ ppm |
| E-coat Composition | 495 mls/ | 495 mls/ | 495 mls/ | 495 mls/ | 495 mls/ | 495 mls/ |
| Deionized water/ e-coat waste | 5 mls | 5 mls | 5 mls | 5 mls | 5 mls | 5 mls |
| pH to 2.9 | 34 drops | 38 drops | 36 drops | 40 drops | 37 drops | 37 drops |
| pH to 8.5 | 60 drops | 61 drops | 63 drops | 64 drops | 61 drops | 62 drops |
| Floc size/appearance | lg. fluffy/hazy | lg. sl. fluffy/ very hazy | lg. fluffy/hazy | lg. fluffy/hazy | large/hazy | large/hazy |
| Turbidity | 144 | 95 | 103 | 139 | 99.3 | 80 |
| Detackification | very bad | good | fair | bad | good | good |
| 50 rpm: | 0% | 75% | 50% | 20% | 100% | 100% |
| 100 rpm: | 20% | 95% | 75% | 50% |  |  |

TABLE 7

Table 7 sets forth the results of test performed utilizing various aluminum hydroxy chlorides as substitutes for $Al_2HO_5Cl$ in the preferred embodiment. These aluminum hydroxy chlorides are:

| Aluminum hydroxy chloride | FORMULA | % BASICITY | % SOLIDS | % $Al_2O_3$ |
|---|---|---|---|---|
| A Preferred Embodiment | $Al_2(OH)_5Cl$ | 83 | 50 | 23.5 |
| B | $Al_2(OH)_3Cl_2(SO_4)_{0.5}$ | 50 | 30 | 10 |
| C | $Al_2(OH)_{1.8}Cl_{4.2}$ | 30 | 33 | 8 |
| D | $Al_2(OH)_3Cl_2(SO_4)_{0.5}$ | 70 | 50 | 15 |
| E | $Al_2(OH)_3Cl$ | 50 | 33 | 10 |
| F | Ferrous Chloride ($FeCl_2$) | — | 28 | — |
| G | $Al_2(OH)_2Cl_4$ | 30 | 40 | — |
| H | $Al_2(OH)_3Cl_3$ | 55 | 40 | — |
| I | $Al_2(OH)_3SO_4SiO_3$ | -35 | -35 | — |

TABLE 7

| Description | Preferred Embodiment | C | D | E | H | G | B | I | F |
|---|---|---|---|---|---|---|---|---|---|
| Product Dilution | 7.5 gms/ | 7.5 gms/ | 7.5 gms/ | 7.5 gms/ | 7.5 gms/ | 7.5 gms/ | 7.5 gms/ | 7.5 gms/ | 7.5 gms/ |
| Deionized water/ product | 2.5 gms | 2.5 gms | 2.5 gms | 2.5 gms | 2.5 gms | 2.5 gms | 2.5 gms | 2.5 gms | 2.5 gms |
| Appearance | lt. amber | lt. amber | lt. amber | yellow | yellow | yellow | yellow | yellow | yellow |
| Use Concentration (mls/ppm) | 0.60 mls/ 300 ppm | 0.60 mls/ 300 pp | 0.60 mls/ 300 ppm | 0.60 mls/ 300 ppm | 0.60 mls/ 300 ppm | 0.60 mls/ 300 ppm | 0.60 mls/ 300 ppm | 0.60 mls/ 300 ppm | 0.60 mls/ 300 ppm |
| E-coat Composition | 495 mls/ | 495 mls/ | 495 mls/ | 495 mls/ | 495 mls/ | 495 mls/ | 495 mls/ | 495 mls/ | 495 mls/ |
| Deionized water/ e-coat waste | 5 mls | 5 mls | 5 mls | 5 mls | 5 mls | 5 mls | 5 mls | 5 mls | 5 mls |
| pH to 2.9 | 46 drops | 37 drops | 41 drops | 38 drops | 39 drops | 39 drops | 38 drops | 38 drops | 35 drops |
| pH to 8.5 | 105 drops | 105 drops | 131 drops | 120 drops | 106 drops | 92 drops | 100 drops | 106 drops | 106 drops |
| Floc size/appearance | lg. fluffy/ clear | lg. fluffy/ sl. haze | lg. fluffy/ sl. haze | lg. fluffy/ sl. haze | lg. fluffy/ sl. haze | lg. fluffy/ sl. haze | lg. fluffy/ sl. haze | lg. fluffy/ sl. haze | lg. fluffy/ sl. haze |
| Turbidity | 18.5 | 35.7 | 29.0 | 34.9 | 52.4 | 35.3 | 33.4 | 36.6 | 53.9 |
| Detackification | good | good | good | good | fair–good | fair–good | fair–good | good | good |
| 50 rpm: | 90%–95% | 100% | 90% | 85%–90% | 80%–85% | 80%–85% | 80%–85% | 85% | 80%–85% |
| 100 rpm: | 100% |  | 100% | 100% | 100% | 100% | 100% | 100% | 100% |

TABLE 8

Table 8 illustrates the performance of the preferred embodiment compared to the performance when substitutions of various components are made in the same volume and concentration. The second column shows the effect of the substitution of $FeBr_3$ for $FeCl_3$. 4023-8A 4023-8C and 4023-8E show the results of the substitution of the noted phosphorous compound for MAP. 4023-13A and 4023-13A show the results of the substitution of the noted component for $CaCl_2$.

TABLE 8

| Description | Preferred Embodiment | FeBr$_3$ | NH$_4$HPO$_4$ | KH$_2$PO$_4$ | Na$_2$PO$_4$ | MgCl$_2$ | BaCl$_2$ |
|---|---|---|---|---|---|---|---|
| Product Dilution | 7.5 gms/ | 7.5 gms/ | 7.5 gms/ | 7.5 gms/ | 7.5 gms/ | 7.5 gms/ | 7.5 gms/ |
| Deionized water/ product | 2.5 gms | 2.5 gms | 2.5 gms | 2.5 gms | 2.5 gms | 2.5 gms | 2.5 gms |
| Appearance | med. lt. amber | very lt. amber | reddish | dk. reddish | dk. reddish | med. lt. amber | med. lt. amber |
| Use Concentration (mls/ppm) | 0.60 mls/ 300 ppm | 0.60 mls/ 300 ppm | 0.60 mls/ 300 ppm | 0.60 mls/ 300 ppm | 0.60 mls/ 300 ppm | 0.60 mls/ 300 ppm | 0.60 mls/ 300 ppm |
| E-coat Composition | 495 mls/ | 495 mls/ | 495 mls/ | 495 mls/ | 495 mls/ | 495 mls/ | 495 mls/ |
| Deionized water/ e-coat waste | 5 mls | 5 mls | 5 mls | 5 mls | 5 mls | 5 mls | 5 mls |
| pH to 2.9 | 38 drops | 31 drops | 42 drops | 40 drops | 49 drops | 40 drops | 48 drops |
| pH to 8.5 | 94 drops | 28 drops | 94 drops | 103 drops | 105 drops | 92 drops | 107 drops |
| Floc size/appearance | lg. fluffy/ clear | lg. fluffy/ sl. cloudy | lg. fluffy/ sl. haze | lg. fluffy/ hazy | lg. fluffy/ hazy | med. fluffy/ clear | med. fluffy/ hazy |
| Turbidity | 30 | 70 | 23.8 | 29.3 | 34.6 | 28.8 | 40.1 |
| Detackification | good | good | good | fair | fair | good | fair–good |
| 50 rpm: | 80% | 85% | 90% | 50% | 75% | 90% | 80% |
| 100 rpm: | 100% | 99% | 100% | 100% | 100% | 100% | 100% |

What is claimed is:

1. A composition comprising the reaction product of one or more trivalent metal salts other than chromium salts, an acid phosphorous compound and an aluminum hydroxy chloride, wherein said composition comprises:

36% ferric chloride solution;

phosphorous acid flake;

epichlorohydrin-dimethylacrylate; and

50% Al$_2$(OH)$_5$Cl.

2. The composition of claim 1, wherein said composition comprises:

about 48 weight percent 36% ferric chloride solution;

about 8 weight percent phosphorous acid flake;

about 8 weight percent epichlorohydrin-dimethylacrylate; and about 36 weight percent 50% Al$_2$(OH)$_5$Cl.

3. A composition comprising the reaction product of one or more trivalent metal salts other than chromium salts, an acid phosphorous compound and an aluminum hydroxy chloride, wherein said composition comprises:

36% ferric chloride solution;

phosphorous acid flake;

polydiallyldimethylaluminum chloride;

50% Al$_2$(OH)$_5$Cl; and water.

4. The composition of claim 3, wherein said composition comprises:

about 24 weight percent 36% ferric chloride solution;

about 4 weight percent phosphorous acid flake;

about 4 weight percent polydiallyldimethylaluminum chloride;

about 18 weight percent 50% Al$_2$(OH)$_5$Cl; and about 50 weight percent water.

5. A composition comprising the reaction product of one or more trivalent metal salts other than chromium salts, an acid phosphorous compound and an aluminum hydroxy chloride, wherein said composition comprises:

40% ferric chloride solution;

70% phosphorous acid solution; and

50% Al$_2$(OH)$_5$Cl.

6. The composition of claim 5, comprising:

about 51 weight percent 40% ferric chloride solution;

about 11 weight percent 70% phosphorous acid solution; and about 38 weight percent 50% Al$_2$(OH)$_5$Cl.

* * * * *